(12) United States Patent  
Okamura et al.

(10) Patent No.: US 8,417,850 B2  
(45) Date of Patent: Apr. 9, 2013

(54) INFORMATION PROCESSING DEVICE AND METHOD FOR PROCESSING SIGNAL OF INFORMATION PROCESSING DEVICE

(75) Inventors: Tatsuya Okamura, Yokohama (JP); Kazuma Ueno, Yamato (JP); Toyoshige Ohshika, Fujisawa (JP); Yohei Kato, Fujisawa (JP); Nobuaki Kabuto, Kunitachi (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 12/912,842

(22) Filed: Oct. 27, 2010

(65) Prior Publication Data

US 2011/0176057 A1 Jul. 21, 2011

(30) Foreign Application Priority Data

Jan. 20, 2010 (JP) ................................. 2010-010024

(51) Int. Cl.
*G06F 3/00* (2006.01)
*G06F 5/00* (2006.01)
(52) U.S. Cl. .......................................... 710/38; 710/17
(58) Field of Classification Search ................... 710/17, 710/38
See application file for complete search history.

(56) References Cited

U.S. PATENT DOCUMENTS

| | | |
|---|---|---|
| 2006/0089735 A1 | 4/2006 | Atkinson |
| 2007/0252746 A1 | 11/2007 | Hoffert et al. |
| 2009/0190033 A1 | 7/2009 | Asada et al. |

FOREIGN PATENT DOCUMENTS

| | | |
|---|---|---|
| EP | 1 596 592 | 11/2005 |
| JP | 2009-141642 | 6/2009 |

*Primary Examiner* — Farley Abad
(74) *Attorney, Agent, or Firm* — Antonelli, Terry, Stout & Kraus, LLP.

(57) ABSTRACT

An information processing device is provided with plural HDMI connectors through which an audio signal is supplied to the other information processing device. The device allows selection of an audio signal supply destination. The audio signal supply is requested, and the audio signal is supplied to the specified information processing device in the requested arriving order. The information processing device of a specific type is determined as a priority device which is preferentially selected to receive the audio signal. If the information processing device of specific type is determined as the priority device, and supply of the audio signal therefrom is requested, the audio signal is supplied to the priority device by terminating the audio signal supply to the other information processing device. The audio signal may be supplied to plural supply destinations.

4 Claims, 10 Drawing Sheets

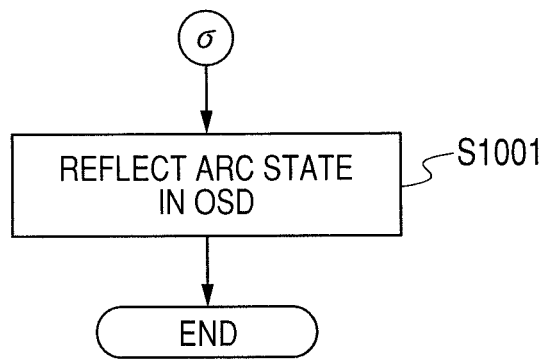
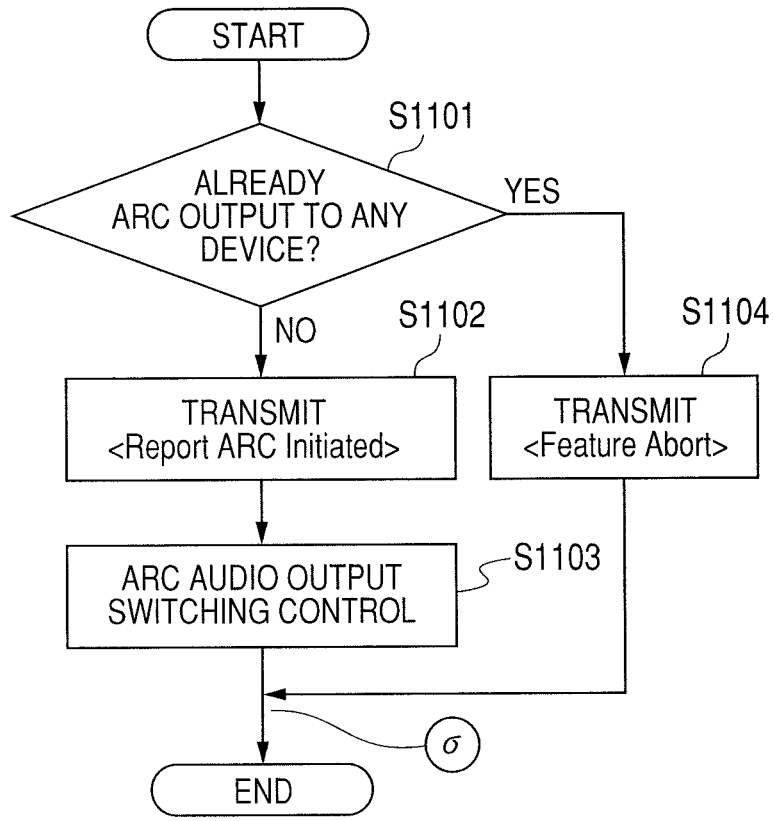

INFORMATION PROCESSING DEVICE AND METHOD FOR PROCESSING SIGNAL OF INFORMATION PROCESSING DEVICE

INCORPORATION BY REFERENCE

This application relates to and claims priority from Japanese Patent Application No. 2010-010024 filed on Jan. 20, 2010, the entire disclosure of which is incorporated herein by reference.

BACKGROUND OF THE INVENTION (1) Field of the Invention

The present invention relates to an information processing device, and a method for processing a signal of the information processing device. Specifically, the present invention relates to an information processing device for outputting an audio signal to an external device by selecting any one of plural HDMI (High Definition Multimedia Interface) terminals, and a method for processing the signal of the information processing device.

(2) Description of the Related Art

Accompanied with wide distribution of equipment adaptable to digital broadcasting, the HDMI connector has been increasingly employed as the interface for devices which process video and audio signals. There exists equipment provided with plural HDMI connectors.

Japanese Patent Application Laid-Open No. 2009-141642 discloses the solution to the problem of "output delay of the HDMI receiver which is brought into the state to receive the video signal from the source device after authentication" (see paragraph [0005]) by providing "a receiver device which includes plural digital input terminals, a signal receiver unit for receiving a video signal, and a switching unit for selectively connecting the plural digital input terminals to the signal receiver unit. The signal receiver unit receives the video signal from the external device after authentication with the external device connected to the digital input terminal selected by the switching unit via a transmission channel. The receiver unit further includes a priority order determination unit for periodically determining with respect to priority among plural digital input terminals based on the external device connection information in the plural digital input terminals and the selection information of the video signal for user's image display operation, and a control unit for controlling the switching unit so that the digital input terminal determined by the priority order determination unit as having the highest priority is connected to the signal receiver unit".

SUMMARY OF THE INVENTION

The system structured using the generally employed information processing device will be described referring to the drawings, focusing especially on the audio signal.

FIG. 1 is a block diagram illustrating an example of the generally employed display system. FIG. 1 represents a display device 100 as the information processing device serving as a main component. The display device 100 is structured to display TV broadcasting images received by a broadcast receiver antenna 101.

An audio system 102 and a reproducer-1 (104) which are provided with plural HDMI connectors, respectively may be an example of the information processing device according to the present invention serving as an external device of the display device 100. Such device is connected to the display device 100 via individual HDMI connectors. That is, signal lines indicated by large arrows are connected to the respective HDMI connectors such that video and audio signals are supplied from the external device to the display device 100. A recorder-1 (103) is connected to the display device 100 via the HDMI connector of the audio system 102.

In the state illustrated in FIG. 1 representing the broadcasting received by the broadcast receiver antenna 101, the display device 100 does not display the signal supplied from the external device. Meanwhile, as a thin arrow indicates in the drawing, an interface for optically transmitting a digital audio signal from the display device 100 to the audio system 102 is provided for the purpose of allowing better identification of the audio signal in the audio system 102 upon the broadcasting. In this case, however, the user is required to connect the optical cable separately from the cable for the HDMI connector, thus deteriorating usability.

The aforementioned problem may occur in the case where the display device 100 displays the video signal from the reproducer-1 (104), and further transmits the audio signal to the audio system 102.

The recent HDMI standard adds the ARC (Audio Return Channel) function for transmitting the audio signal to the other information processing device using the HDMI connector. This will be described referring to FIG. 2.

FIG. 2 is a block diagram illustrating another example of the generally employed display system. The HDMI connector is provided with an audio signal transmission channel marked as ARC, which allows transmission of the audio signal from one information processing device to the other device.

Referring to FIG. 2, when the display device 100 receives and displays the broadcast, the user is allowed to listen to the sound with good quality from a speaker 102A of the audio system 102 by outputting the audio signal to the audio system 102 through the ARC. Alternatively, the audio signal from the recorder-1 (103) may be supplied to the other information processing device via the audio system 102 and the display device 100.

In the case where the reproducer-1 (104) exhibits an audio reproducing function, and is capable of processing the supplied audio signal, if the ARC audio output is required by the reproducer-1 (104) without limiting the number of the HDMI connectors for the ARC sound output, the risk that the speaker 104A generates the same sound as the one generated by the speaker 102A may occur.

In order to cope with the aforementioned problem, the method may be used for determining and fixing one of the HDMI connectors for outputting the ARC audio signal. The aforementioned method may bother the user to re-connect the device required to receive the audio signal to the determined HDMI connector in each case, resulting in deteriorating usability of the system.

The present invention provides an information processing device for processing an input information signal which contains an audio signal. The device includes plural HDMI connectors for transmission and reception of the information signal with an external information processing device, an audio separation unit for separating the audio signal from the information signal supplied from the HDMI connector, an output connector selection unit which selects at least one of the plural HDMI connectors so as to supply the audio signal separated by the audio separation unit to the selected HDMI connector, or does not supply the audio signal to any one of the HDMI connectors, and a control unit for controlling an entire operation of the information processing device, wherein the control unit controls the output connector control unit to output the separated audio signal to the external information processing device from a predetermined one of the plural HDMI connectors based on a predetermined condition.

The present invention provides an information processing device for processing an input information signal which contains a video signal and an audio signal. The device includes plural HDMI connectors for transmission and reception of the information signal with an external information processing device, a first video audio separation unit for separating a first video signal and a first audio signal accompanied with the first video signal from the information signal supplied from the HDMI connector, a broadcast receiver unit for receiving a broadcast signal of a television broadcast, a second video audio separation unit for separating a second video signal and a second audio signal accompanied with the second video signal from the broadcast signal received by the broadcast receiver unit, an input switching unit for selecting one of the supplied first video signal separated by the first video audio separation unit and the supplied second video signal separated by the second video audio separation unit, and selecting one of the first audio signal separated by the first video audio separation unit and the second audio signal separated by the second video audio separation unit in synchronization with the video signal, a display unit for receiving the video signal selected by the input switching unit to display the video information contained in the video signal, a speaker for receiving the audio signal selected by the input switching unit to generate audio information contained in the audio signal, an output connector selection unit which receives the audio signal selected by the input switching unit to supply the audio signal to at least one of the plural HDMI connectors by selection or does not supply the audio signal to any one of the HDMI connectors, and a control unit for controlling an entire operation of the information processing device. The control unit controls the output connector control unit to output the separated audio signal from a predetermined one of the plural HDMI connectors to the external information processing device based on a predetermined condition.

The present invention provides a method for processing a signal of an information processing device which processes an input information signal which contains an audio signal and includes plural HDMI connectors for transmission and reception of the information signal with an external information processing device. The method includes connection device determination step for determining whether or not a device of specific type exists among the external information processing devices connected to the HDMI connectors, and signal output determination step for determining whether or not the input audio signal has been output to an arbitrary number of the external information processing devices when it is determined in the connection device determination step that the device of specific type has been connected. When it is determined in the signal output determination step that the audio signal has not been output to the arbitrary number of the external information processing devices, the audio signal is output to the external information processing device as the device of specific type.

The present invention provides a method for processing a signal of an information processing device which processes an input information signal which contains an audio signal, and includes plural HDMI connectors for transmission and reception of the information signal with an external information processing device. The method includes connection device determination step for determining whether or not a priority device for preferentially supplying the input audio signal to the external information processing device connected to the plural HDMI connectors exists, and signal output determination step for determining whether or not the input audio signal has been already output to an arbitrary number of the other external information processing devices when it is determined in the connection device determination step that the priority device has been connected. When it is determined in the signal output determination step that the input audio signal has not been output to the arbitrary number of the other external information processing devices, the audio signal is output to the external information processing device as the priority device. When it is determined that the input audio signal has been output to the arbitrary number of the other external information processing device, the audio signal output to the arbitrary number of the other external information processing devices is terminated to output the audio signal to the external information processing device as the priority device.

The present invention provides a method for processing a signal of an information processing device which processes an input information signal which contains an audio signal, and includes plural HDMI connectors for transmission and reception of the information signal with an external information processing device. The method includes reception step for receiving a request transmitted by the external information processing device to output the input audio signal, and output determination step for determining whether or not the audio signal has been already output to arbitrary number of other information processing devices when receiving the request in the reception step. When it is determined in the output determination step that the audio signal has been already output to the arbitrary number of the information processing devices, the external information processing device rejects the transmitted request.

The present invention provides a method for processing a signal of an information processing device which processes an input information signal that contains an audio signal, and includes plural HDMI connectors for transmission and reception of the information signal with an external information processing device. A priority device is set among the external information processing devices so that the information processing device preferentially supplies the input audio signal. The method includes reception step for receiving a request transmitted by the external information processing device to output the input audio signal, output determination step for determining whether or not the audio signal has been already output to arbitrary number of other information processing devices when receiving the request in the reception step, and request determination step for determining whether or not the request has been received from the priority device when it is determined in the output determination step that the audio signal has been already output to the arbitrary number of other information processing devices. When it is determined in the request determination step that the request has been received from the priority device, supply of the audio signal to the arbitrary number of other information processing devices is terminated to supply the audio signal to the information processing device as the priority device.

The present invention provides the information processing device which selects an arbitrary number of devices from plural HDMI connectors, and outputs audio signals to the external device, and a method for processing signals of the information processing device. This makes it possible to provide the effect for improving usability of the user.

BRIEF DESCRIPTION OF THE DRAWINGS

These and other features, objects and advantages of the present invention will become more apparent from the following description when taken in conjunction with the accompanying drawings wherein:

FIG. 10 is a flowchart of an OSD display processing according to an embodiment of the present invention;

FIG. 11 is a fourth flowchart of the audio output processing according to the embodiment of the present invention;

DETAILED DESCRIPTION OF THE EMBODIMENT

Figure 1:
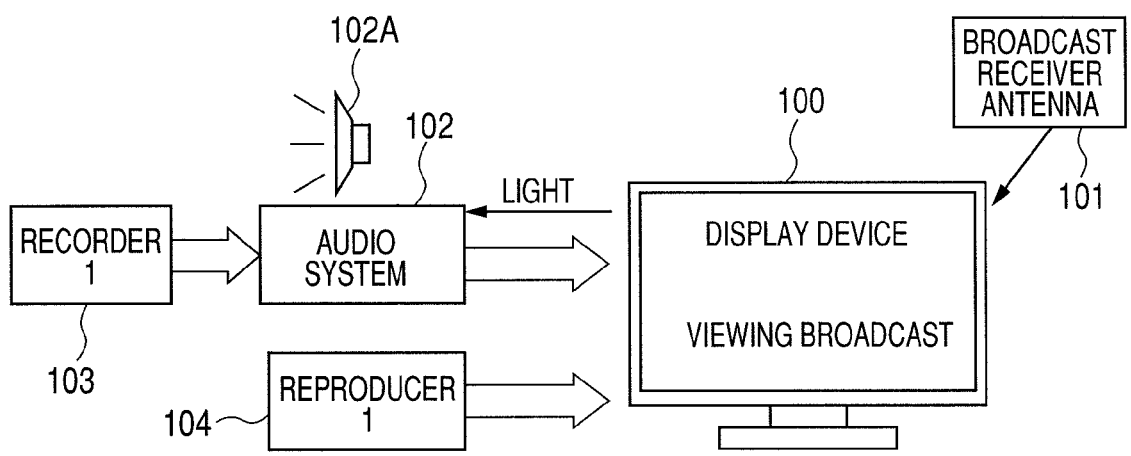
FIG. 1 is a block diagram illustrating an example of a generally employed display system.
Figure 2:
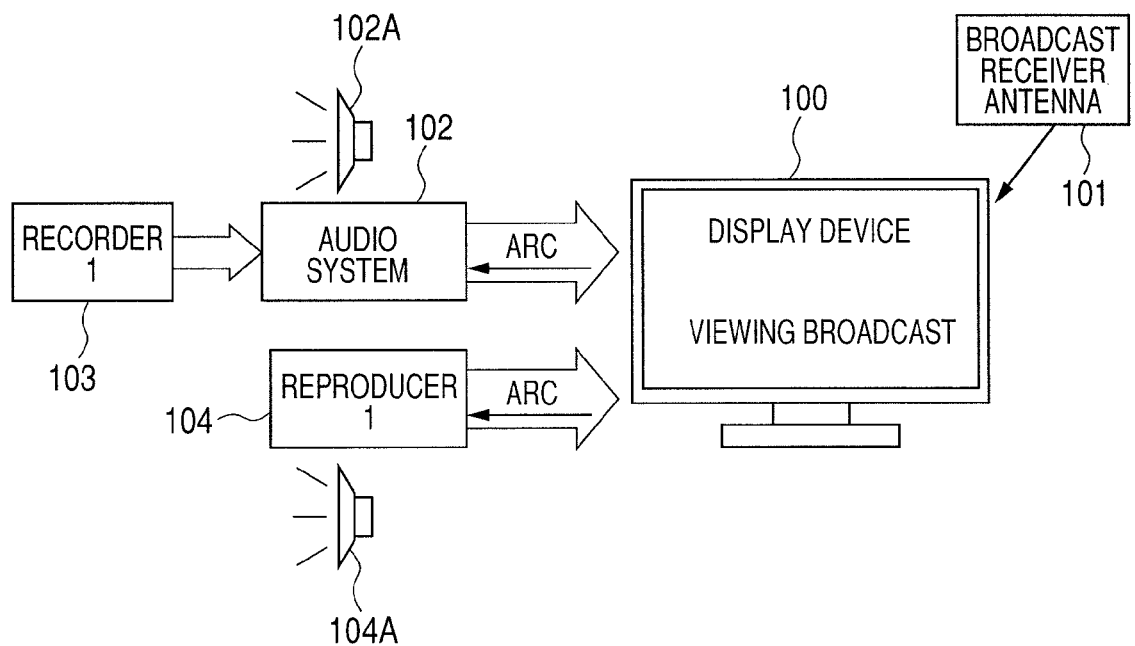
FIG. 2 is a block diagram illustrating another example of the generally employed display system.

An embodiment of the present invention will be described referring to the drawings.

Figure 3:
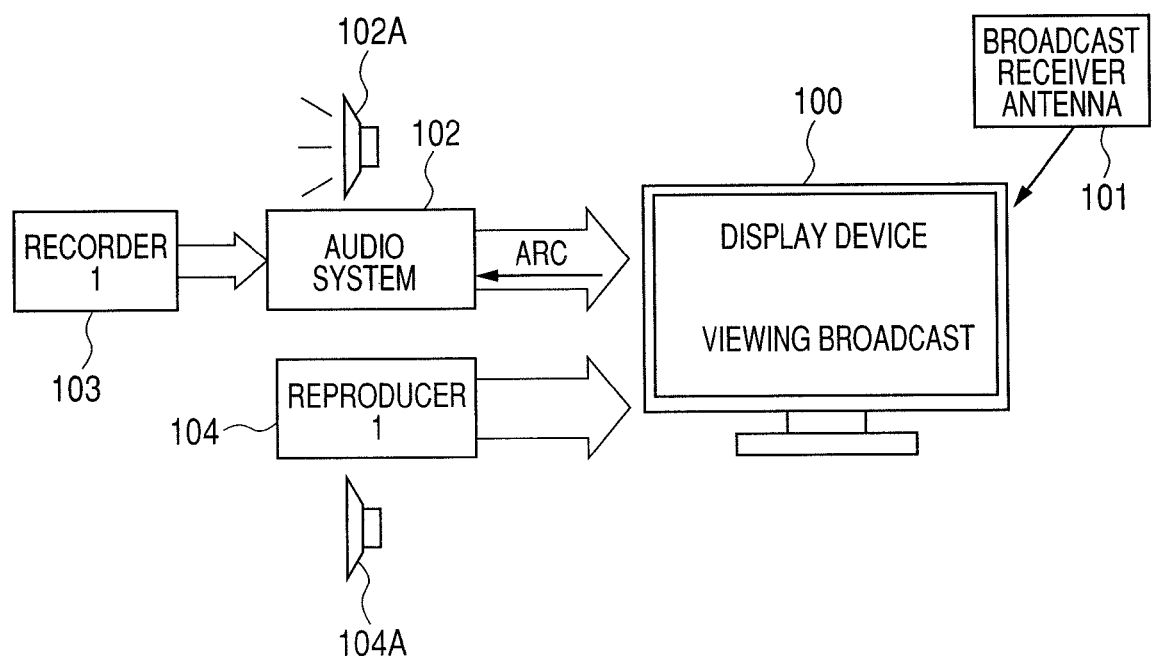
FIG. 3 is a block diagram of a display system according to an embodiment of the present invention.

FIG. 3 is a block diagram illustrating a display system according to an embodiment of the present invention. Unlike the generally employed system as described above, in the system of the embodiment, the use of ARC allows selection of the HDMI connector for executing the audio signal output without being fixed. If the audio signal is not necessary, the system may be structured not to output the audio signal from all the HDMI connectors. Alternatively, the system may also be structured to output the audio signal from at least one HDMI connector requiring the audio signal. In the aforementioned case as illustrated in FIG. 3, the system may be structured to allow only the speaker 102A to generate sounds, while preventing the speaker 104A from generating the sound.

Figure 4:
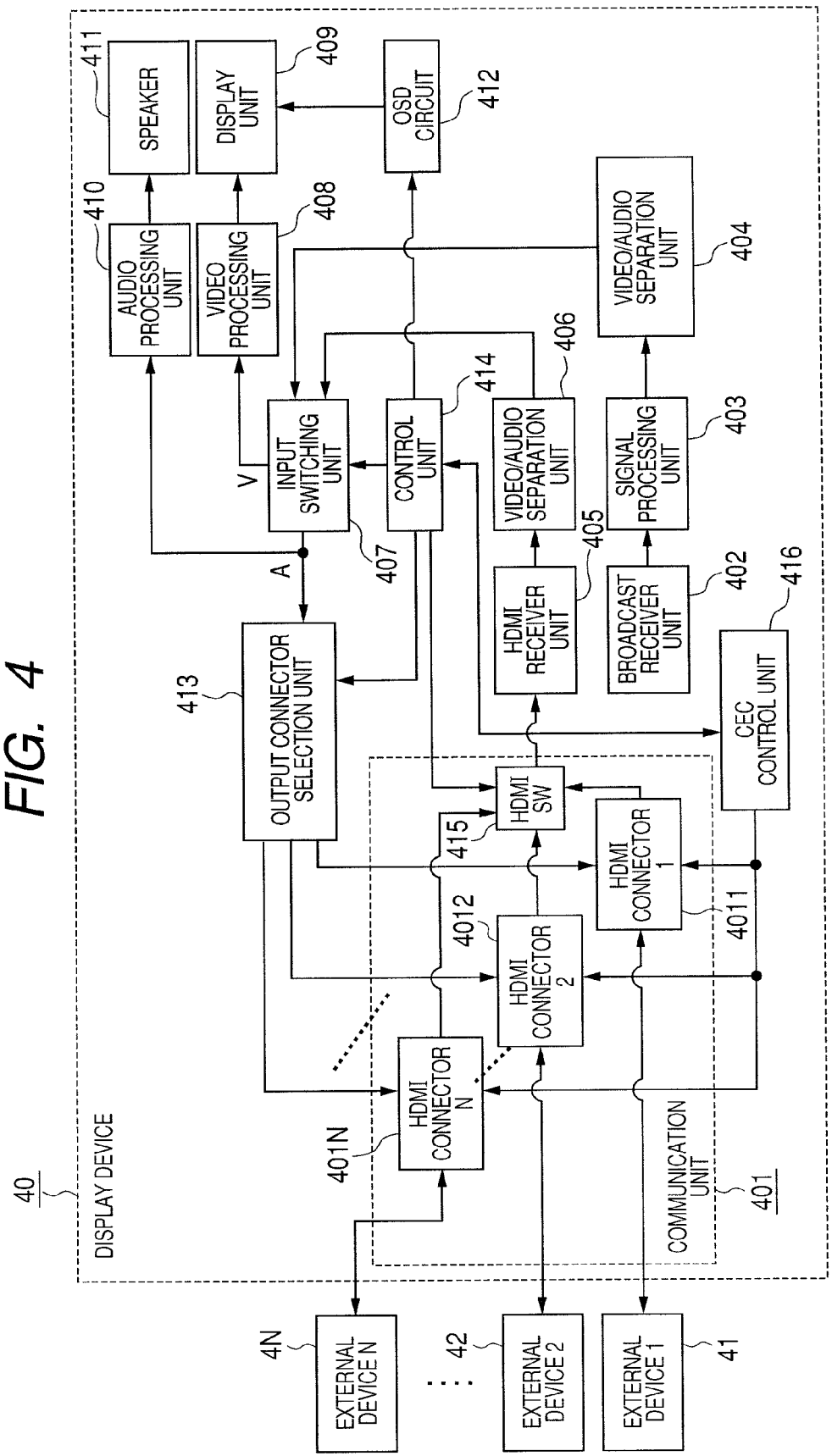
FIG. 4 is a block diagram of an information processing device according to an embodiment of the present invention.

FIG. 4 is a block diagram of the information processing device according to an embodiment of the present invention. The entire operation of the information processing device structured as a display device 40 will be described referring to FIG. 4.

A broadcast radio signal received by the broadcast receiver antenna 101 shown in FIG. 3 is supplied to a broadcast receiver unit 402 which extracts the broadcast signal on the channel required by the user, and executes a frequency conversion to a predetermined frequency band. The signal is then supplied to a signal processing unit 403.

The signal processing unit 403 demodulates the broadcast signal for releasing the modulation process subjected to the signal in the broadcast station for transmission. In case of digital broadcasting, the single broadcast channel is likely to have plural contents time-division multiplexed. The signal processing unit 403 further executes predetermined process, for example, demultiplexing for selecting the single content desired by the user. The output signal of the signal processing unit 403 is supplied to a video/audio separation unit 404 where the video signal and the audio signal are separated so as to be supplied to an input switching unit 407. Referring to FIG. 4, single arrow is intermediately drawn between the video/audio separation unit 404 and the input switching unit 407 for avoiding the drawing complexity. Actually, however, the video signal and the audio signal are separately transmitted.

Transmission and reception of the signal with the external device will be described.

The display device 40 is provided with plural (N) HDMI connectors 1 to N (4011-401N). Each connector is connected to the HDMI connector (not shown) of external devices 1 to N (41-4N) as the respective information processing devices via a HDMI cable. The external devices 1 to N may be recorders such as a DVD recorder as described above, reproducers such as a DVD player, or audio systems for driving the speaker. Those components may be combined, or the external devices may not be connected to any of the HDMI connectors. Referring to FIG. 3, additional external device may further be connected via any one of the external devices. The display device 40 may be provided with plural HDMI connectors, for example, two connectors as illustrated in FIG. 3.

A CEC (Consumer Electronics Control) control unit 416 executes a bidirectional control of the external devices 1 to N (41-4N) based on the HDMI standard via the HDMI connectors 1 to N (4011-401N).

The CEC control unit 416 executes ARC authentication of the external devices 1-N (41-4N) via the HDMI connectors 1-N (4011-401N) in accordance with the command from the control unit 414 so as to determine whether the device is the ARC adaptable external device conforming to the HDMI standard. Upon the ARC audio output, the ARC authentication has to be performed conforming to the standard. Since the ARC authentication is not a subject of the present invention, the detailed explanation will be omitted.

When the video contents supplied from the external device such as the recorder and the reproducer are viewed by the user, the user is required to command the control unit 414 from a remote control (not shown) with respect to the external device for supplying the desired signal. The control unit 414 then transmits the command to a HDMI_SW 415. The HDMI_SW 415 allows the information signal supplied from the external device desired by the user to be supplied to the HDMI receiver unit 405 from the HDMI connectors 4011 to 401N.

The information signal which has been input from any one of the external devices 1 to N (4011-401N), and supplied to the HDMI receiver unit 405 is subjected to a predetermined process, and is further input to a video/audio separation unit 406 so that the video and the audio signals are separated and supplied to an input switching unit 407. The single arrow is drawn between the video/audio separation unit 406 and the input switching unit 407. Actually, however, the video and audio signals are separately transmitted.

As described above, the control unit 414 controls the input switching unit 407 based on the user's command from the remote control. The input switching unit 407 selects the signal desired by the user from those supplied from the video/audio separation unit 404 or 406. The selected video signal (V shown in the drawing) is subjected to a predetermined video processing in the video processing unit 408 such that the video image is displayed on the display unit 409 of the display device 40.

The audio signal (A shown in the drawing) selected by the input switching unit 407 is subjected to a predetermined audio processing by an audio processing unit 410 such that the sound is output from the speaker 411 of the display device 40.

The audio signal (A shown in the drawing) selected by the input switching unit 407 is also supplied to an output connector selection unit (referred to as ARC control unit) 413. The output connector selection unit 413 supplies the audio signal to at least one of the HDMI connectors 4011 to 401N so as to be ARC output to the external device as illustrated in FIG. 3. Alternatively, the output connector selection unit 413 does not supply the audio signal to any one of the HDMI connectors 4011 to 401N based on the command from the control unit 407.

When commanding the output connector selection unit 413 with respect to the destination of the ARC audio signal output, the control unit 414 determines the destination as follows. If the ARC audio signal output has been already executed to the specified external device, such state may be maintained by a certain method. There may also be the method for allowing the control unit 414 to determine the audio system, for example, preferentially as the output destination.

There is the method for the user to designate the type of the external device as the output destination to the control unit 414 from the remote control, for example. Meanwhile, it is substantially meaningless to return the audio signal to the external device which has supplied the audio signal to the display device 40, or the one dedicated to perform the reproducing function such as the DVD player. As described above, in most of the case, it is not preferable to allow the speaker of the device with plural audio reproducing functions to output sounds. Preferably, the control unit 414 controls the output connector selection unit 413 in consideration of those circumstances in addition to the user's designation as described above.

The control unit 414 controls the OSD (On Screen Display) circuit 412 to allow the display unit 409 to execute OSD display for the purpose of notifying the user of the external device connection state, for example. This will be described in detail, taking the specific display image as the example.

The control unit 414, the CEC control unit 416 and the output connector selection unit 413 are illustrated in the separate blocks. However, they are not limited to the aforementioned structure. Those components have a common feature of controlling the other block, and accordingly, they may be combined into the same block so as to be built in the same semiconductor chip on the semiconductor device. They may be formed into the single chip on the currently employed device such as DSP (Digital Signal Processor) together with the other signal processing block.

Figure 5:
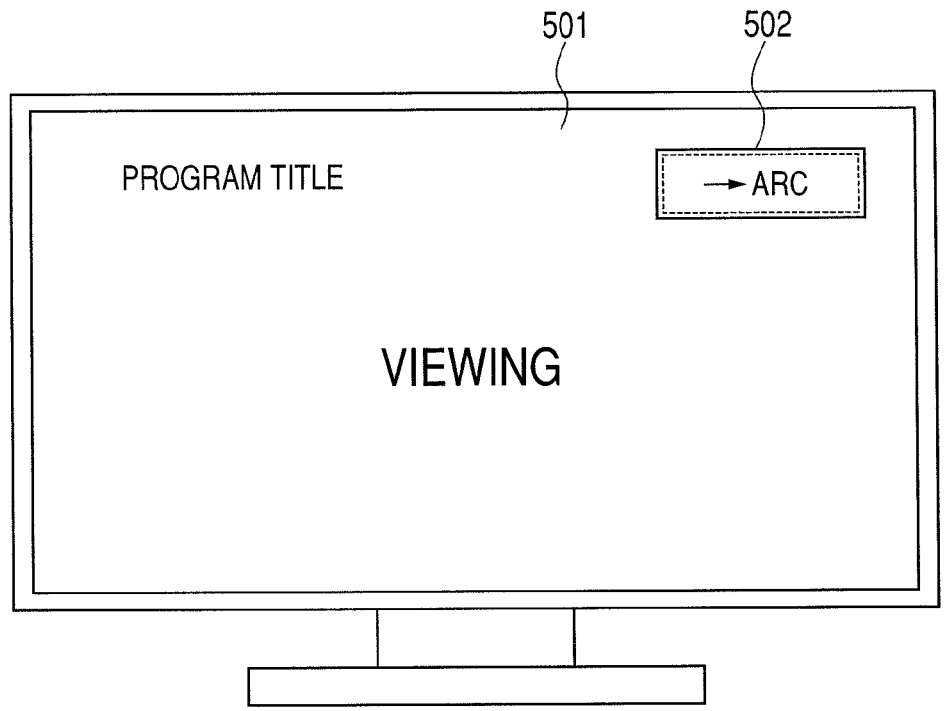
FIG. 5 represents an OSD display on the display device according to an embodiment of the present invention.
Figure 6:
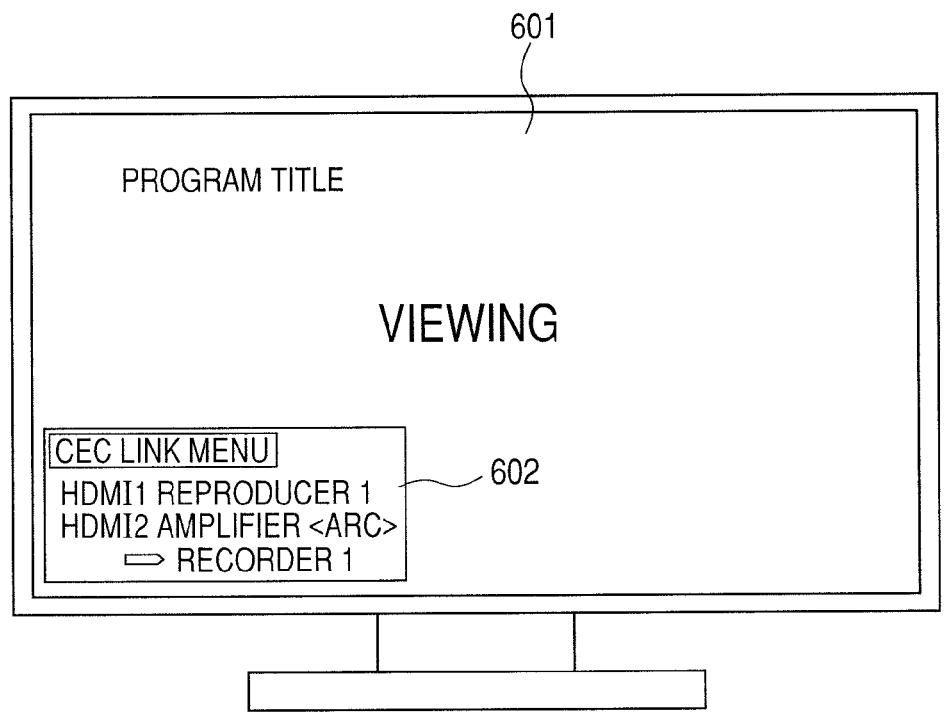
FIG. 6 represents another OSD display on the display device according to an embodiment of the present invention.

FIGS. 5 and 6 illustrate examples of the OSD display on the display unit 409 executed by the OSD circuit 412. As has been well known, the OSD display may be exemplified for displaying the sound volume or the broadcast channel during reception on a part of the screen, or displaying the broadcast program list of the respective broadcast channels with EPG (Electronic Program Guide) on the full screen. Those OSD screens are generated by the OSD circuit 412. The OSD display relevant to the ARC function of the HDMI connector according to the embodiment of the present invention will be described hereinafter.

FIG. 5 illustrates the OSD display on the display device 40 according to an embodiment of the present invention. The video contents from broadcasting and the external device are displayed on a screen 501 (corresponding to 409 shown in FIG. 4). An OSD display 502 indicating the ARC audio signal output to any one of the HDMI connectors is displayed on the upper right portion of the screen.

FIG. 6 illustrates another example of the OSD display according to an embodiment of the present invention. The video contents from the broadcasting and the external device are displayed on a screen 601 (corresponding to 409 shown in FIG. 4). An OSD display 602 indicating the external device connection state is displayed on the lower left on the screen as the CEC link menu.

The illustrated example represents that the HDMI connector 1 (4011) is directly connected to the reproducer-1 such as the DVD player, and the HDMI connector 2 (4012) is directly connected to the audio system equipped with the audio amplifier and speaker, respectively. Those connectors are connected to the recorder-1 such as the DVD recorder via the HDMI connector for the audio system. That is, although the recorder-1 is not directly connected to the HDMI connectors 1 to N (4011-401N of the display device 40 shown in FIG. 4), the signal may be transmitted and received via the HDMI connector of the audio system. The illustrated example shows that the ARC audio signal output is executed to the audio system connected to the HDMI connector 2 (4012).

The aforementioned ARC authentication is supposed to be executed only to the external device directly connected to the HDMI connector of the information processing device. The ARC authentication to the aforementioned recorder-1 is executed by the audio system directly connected to the HDMI connector 2 (4012).

The exemplary OSD display on the display unit 409 executed by the OSD circuit 412 has been described referring to FIGS. 5 and 6. If the information processing device is not provided with the display unit, the OSD information may be superimposed on the video signal.

The method for selecting the external device as the output destination upon execution of the ARC audio signal output by the information processing device will be described referring to FIGS. 7 to 9. The following example assumes that the display device 40 is formed as the device for executing the ARC audio signal output. The other type of the information processing device may be used to operate in the same way without deviating from the scope of the present invention.

Figure 7:
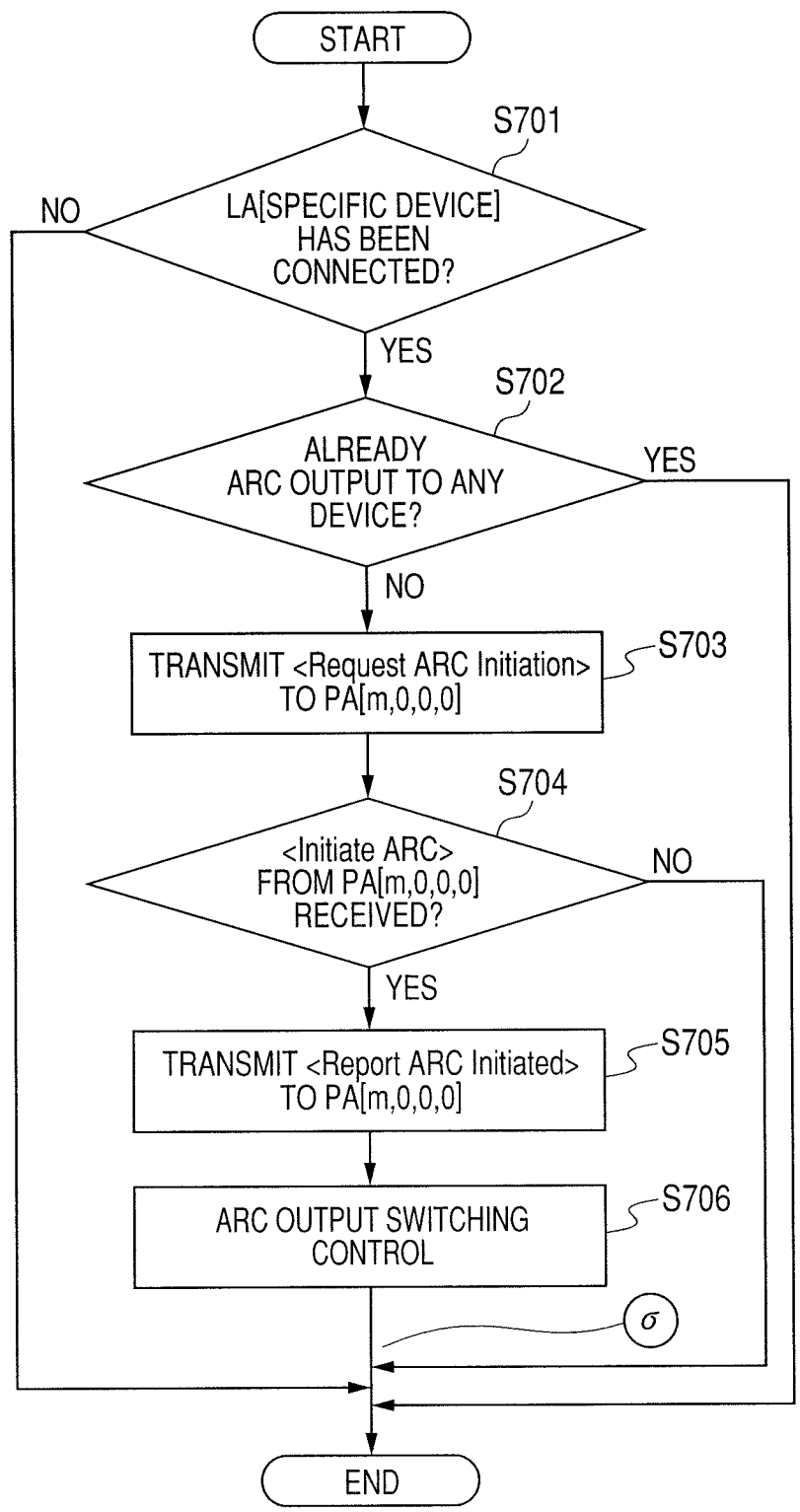
FIG. 7 is a first flowchart of an audio output processing according to the embodiment of the present invention.

FIG. 7 is a first flowchart for the audio output process according to the embodiment of the present invention. FIG. 7 represents the routine for determining the designation of the ARC audio signal output in order of arrival.

In step S701, the CEC control unit 416 of the display device 40 determines whether or not the specific device exists among the connected external devices.

The term "LA" in the flowchart denotes a logical address, specifically, the type of the information processing device. The code unique to the type of the information processing device such as the audio system and the recorder is defined. The specific device described in the flowchart denotes a single type of the information processing device designated by the user. As described above, the system may be structured to prevent designation to the external device regarded as being meaningless to receive the ARC audio signal. Alternatively, manufacturer may preliminarily fix a single kind of the information processing device as the specific device. The term "PA" denotes a physical address which is determined in accordance with the connection state to the HDMI connector. For example, the physical address [1, 0, 0, 0] is allocated to the external device directly connected to the HDMI connector 1 (4011), and the physical address [1, 1, 0, 0] is allocated to the external device connected via the connector.

When it is determined in step S701 that the subject information processing device does not exist among the connected external devices (N in the drawing), the ARC audio output expected by the user cannot be obtained. Then the process ends. When it is determined that the subject information processing device exists among the external devices (Y in the drawing), the process proceeds to step S702 where the control unit 414 determines whether or not the display device 40 has already executed the ARC audio signal output to any one of the information processing devices.

When it is determined in step S702 that the display device 40 has already executed the ARC audio signal output to any one of the information processing devices (Y in the drawing), the process ends. That is, in the routine of the flowchart shown in FIG. 7, the output destination of the audio signal is determined order of arrival.

When it is determined in step S702 that the display device 40 has not executed the ARC audio signal output to any one of the information processing devices (N in the drawing), the process proceeds to step S703 where the CEC control unit 416 transmits a first command (Request ARC Initiation in the drawing) which proposes to initiate the ARC to the information processing device directly connected to the display device 40, that is, the physical address [m, 0, 0, 0] via the HDMI connector m (1≦m≦N) to which the information processing device corresponding to the aforementioned logical address is connected. In the case where the subject information processing device has been connected via the information processing device directly connected to the display device 40 as described above, the first command (Request ARC Initiation) which proposes initiation of the ARC is also transmitted to the information processing device directly connected to the display device 40, that is, at the physical address [m, 0, 0, 0].

According to the ARC rule, if the proposal of the display device 40 is acceptable, the information processing device which has received the first command transmits a second command (Initiate ARC in step S704) to the display device 40 to initiate transmission of the audio signal. In step S704, the CEC control unit 416 determines whether or not the display device 40 has received the second command from the information processing device at the physical address [m, 0, 0, 0].

When it is determined in step S704 that the second command has not been received (N in the drawing), the ARC audio output expected by the user cannot be executed. The process then ends.

When it is determined in step S704 that the second command has been received (Y in the drawing), the process proceeds to step S705 where the CEC control unit 416 transmits a third command (Report ARC Initiated) notifying that the display device 40 initiates execution of the ARC audio signal output to the information processing device at the physical address [m, 0, 0, 0].

In step S706, the output connector selection unit 413 supplies the audio signal from the input switching unit 407 to the mth HDMI connector among the HDMI connectors 1 to N (4011 to 401N) to execute the ARC audio signal transmission. The process then ends.

The OSD display step as described above may be set subsequent to step S706 (σ in the drawing), which may apply to the other flowcharts as described below. The above step will be described referring to FIG. 10.

FIG. 10 is a flowchart of the OSD display process according to an embodiment of the present invention. After initiating the ARC audio signal transmission in the previous step S706, the process proceeds to step S1001 where the OSD circuit 412 displays the OSD as shown in FIGS. 5 and 6 on the display unit 409 based on the command of the control unit 414 so that the user is allowed to know the operation state of the display device 40.

Referring to FIG. 7, the order for executing steps S701 and S702 may be inverted. Step S702 may be set as the condition for determining whether the ARC output is executed to two or more devices such that the ARC audio output is executed up to arbitrary number of devices.

Another example different from the aforementioned operation flow will be described hereinafter.

Figure 8:
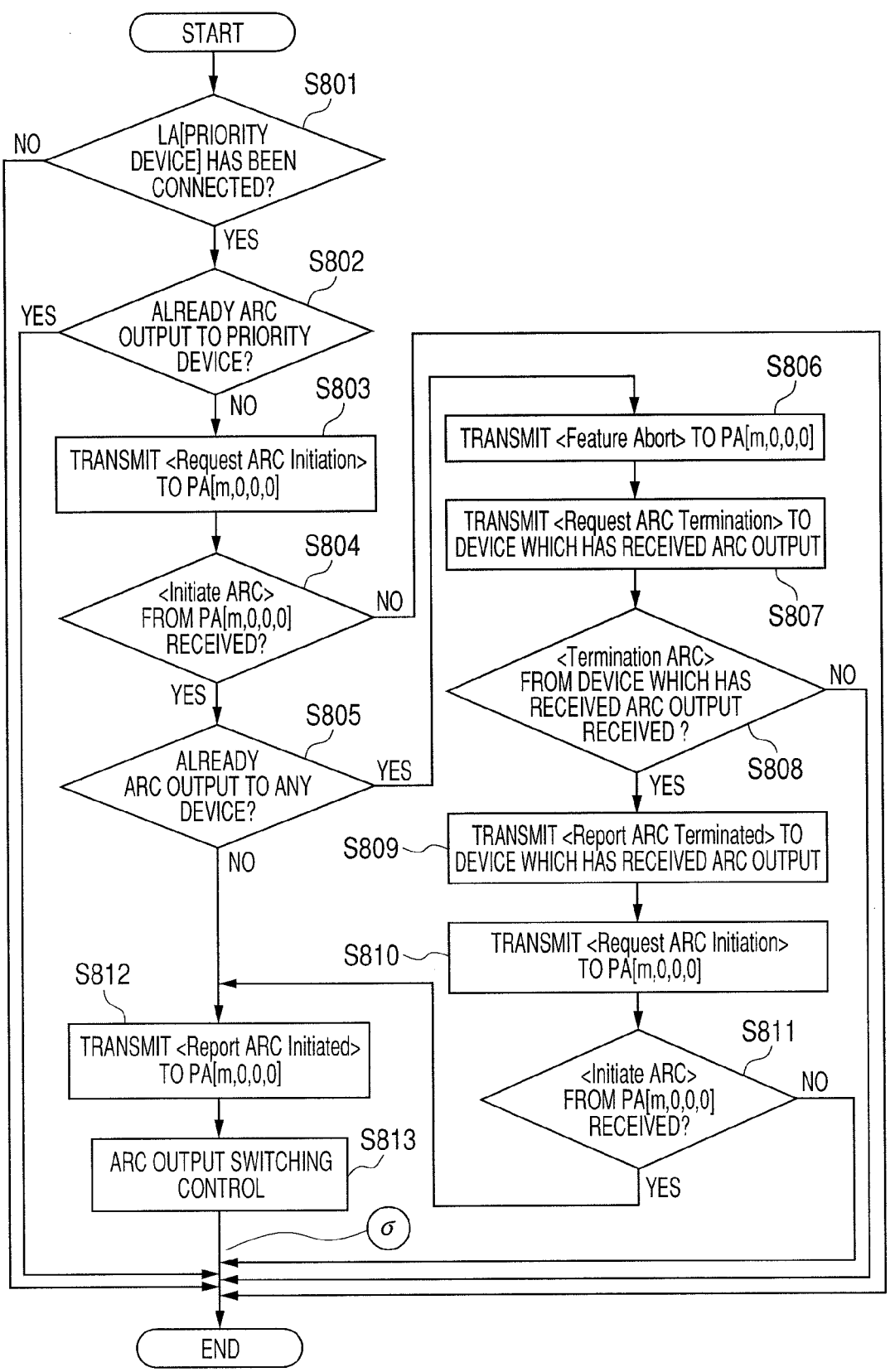
FIG. 8 is a second flowchart of the audio output processing according to the embodiment of the present invention.

FIG. 8 is a second flowchart for the audio output process according to the embodiment of the present invention. Unlike the process shown in FIG. 7, FIG. 8 represents that the specific type of the device with priority, for example, the audio system, is set as the destination of the ARC audio signal output. As for the priority device, the manufacturer of the device may preset the specific type of the information processing device in the control unit 414 of the display device 40 as the priority device, or the user is allowed to designate the priority device. In the case where the user designates the priority device, the system may be structured to prevent designation of the external device to supply the ARC audio signal thereto as described above.

In step S801, the unique code allocated to the priority device has been designated as the logical address. The CEC control unit 416 determines whether or not the priority device designated with the logical address exists among the connected external devices.

When it is determined in step S801 that the subject information processing device does not exist among the connected external devices (N in the drawing), the expected ARC audio output cannot be executed, and accordingly, the process ends. When it is determined that the subject information processing device exists among the connected external devices (Y in the drawing), the process proceeds to step S802 where the CEC control unit 416 determines whether or not the display device 40 has executed the ARC audio signal output to the priority device.

When it is determined in step S802 that the display device 40 has already executed the ARC audio signal output to the priority device (Y in the drawing), the output destination of the audio signal does not have to be changed. Then the process ends.

When it is determined in step S802 that the display device 40 has not executed the ARC audio signal output to the priority device (N in the drawing), the process proceeds to step S803. It is assumed that the priority device has been connected to the display device 40 at the physical address [m, 0, 0, 0] or connected thereto via the information processing device at the physical address [m, 0, 0, 0]. In step S803, the CEC control unit 416 transmits the first command (Request ARC Initiation) which proposes to initiate ARC to the information processing device directly connected to the display device 40, that is, the physical address [m, 0, 0, 0] via the HDMI connector m (1≦m≦N). In the case where the priority device is connected via the information processing device directly connected to the display device 40, the first command (Request ARC Initiation in the drawing) which proposes to initiate the ARC is transmitted to the information processing device directly connected to the display device 40, that is, the physical address [m, 0, 0, 0].

According to the ARC rule, if the priority device which has received the first command accepts the proposal of the display device 40, the priority device is expected to transmit the second command (Initiate ARC in step S804) instructing to initiate audio signal transmission to the display device 40. Then in step S804, the CEC control unit 416 determines whether or not the display device 40 has received the second command from the information processing device at the physical address [m, 0, 0, 0].

When it is determined in step S804 that the second command has not been received (N in the drawing), the expected ARC audio output cannot be executed. Then the process ends.

When it is determined in step S804 that the second command has been received (Y in the drawing), the process proceeds to step S805 where the CEC control unit 416 determines whether or not the display device 40 has already executed the ARC audio signal output to any one of the information processing devices.

When it is determined in step S805 that the display device 40 has not executed the ARC audio signal output to any one of the information processing devices (N in the drawing), the process proceeds to step S812 where the CEC control unit 416 transmits a third command notifying initiation of the ARC audio signal output to the information processing device at the physical address [m, 0, 0, 0] (Report ARC Initiated in the drawing).

When it is determined in step S805 that the display device 40 has already executed the ARC audio signal output to any one of the information processing devices (Y in the drawing), the step for stopping supply of the audio output is executed as described below, and step for initiating the audio output to the information processing device is executed.

In step S806, the CEC control unit 416 transmits a rejection command (Feature Abort in the drawing) to the information processing device at the physical address [m, 0, 0, 0].

In step S807, the CEC control unit 416 transmits a fourth command (Request ARC Termination in the drawing) which proposes to terminate the ARC to the information processing device as the output destination of the ARC audio signal.

According to the ARC rule, if the information processing device receives the fourth command, and accepts the proposal of the display device 40, a fifth command (Terminate ARC in step S808) which commands to terminate the audio signal transmission is transmitted to the display device 40. In step S808, the CEC control unit 416 determines whether or not the display device 40 has received the fifth command from the information processing device.

When it is determined in step S808 that the fifth command has not been received (N in the drawing), the expected ARC audio output cannot be executed. Then the process ends.

When it is determined in step S808 that the fifth command has been received (Y in the drawing), the process proceeds to step S809 where the CEC control unit 416 transmits a sixth command (Report ARC Terminated in the drawing) notifying termination of the ARC audio signal output to the information processing device, and terminates the audio signal output thereto.

In step S810, the CEC control unit 416 transmits the first command (Request ARC Initiation in the drawing) which proposes to initiate the ARC to the information processing device directly connected to the display device 40, that is, the physical address [m, 0, 0, 0] via the HDMI connector m likewise the previous step S803. In the case where the priority device is connected via the information processing device directly connected to the display device 40, the first command (Request ARC Initiation) in the drawing which proposes to initiate the ARC is transmitted to the information processing device directly connected to the display device 40, that is, the physical address [m, 0, 0, 0].

In step S811, the CEC control unit 416 determines whether or not the display device 40 has received the second command (Initiate ARC in the drawing) from the information processing device at the physical address [m, 0, 0, 0].

When it is determined in step S811 that the second command has not been received (N in the drawing), the expected ARC audio output cannot be executed. Then the process ends.

When it is determined in step S811 that the second command has been received (Y in the drawing), the process proceeds to step S812 where the CEC control unit 416 transmits the third command (Report ARC Initiated) notifying that the display device 40 initiates the ARC audio signal output to the information processing device at the physical address [m, 0, 0, 0].

Besides the case where it is determined in the previous step S805 that the display device 40 has not executed the ARC audio signal output to any one of the information processing devices (N in the drawing), and the process proceeds to step S812, in step S813, the output connector selection unit 413 supplies the audio signal from the input switching unit 407 to the mth HDMI connector among the HDMI connectors 1 to N (4011-401N) for transmitting the ARC audio signal. The process then ends. The process shown in FIG. 8 may be structured to allow the process to proceed to step S810 by forcibly stopping the ARC audio signal output when the fifth command has not been received as a result of the determination made in step S808. The process may also be structured to execute step S805 as the condition for determining whether the ARC output is executed to two or more devices so as to allow execution of the ARC up to arbitrary number of the devices by inserting the process for selecting the external device which stops the ARC audio output in steps S807 to 809.

An example of the operation flow which is slightly different from the one represented in FIG. 8 will be described.

Figure 9:
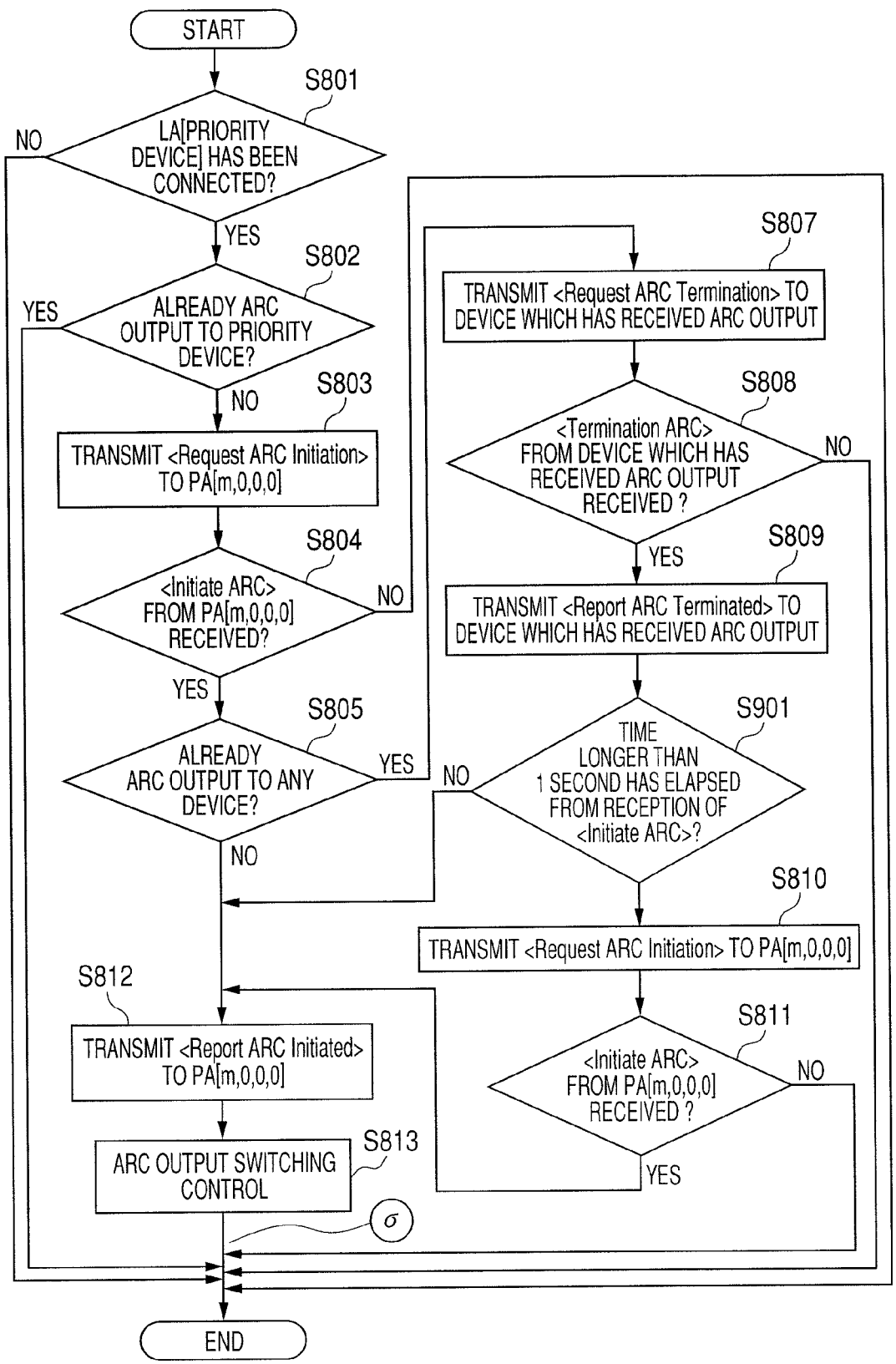
FIG. 9 is a third flowchart of the audio output processing according to the embodiment of the present invention.

FIG. 9 is a third flow chart for the audio output process according to the embodiment of the present invention. Likewise the case in FIG. 8, FIG. 9 represents designation of the output designation of the ARC audio signal, for example, the audio system as the priority device. The routine shown in FIG. 9 is substantially the same as the one shown in FIG. 8 except that step S901 is added while omitting step S806.

Steps S803 and S810 of the flowchart shown in FIG. 8 are the same as well as steps S804 and S811. When it is determined in step S805 shown in FIG. 8 that the display device 40 has executed the ARC audio signal output to any one of the information processing devices (Y in the drawing), the same step will be executed twice.

According to CEC standard, the information processing device is required to respond the command within 1 second except the specific case. Unlike the case shown in FIG. 8, the process shown in FIG. 9 contains step S901 where the CEC control unit 416 determines whether or not a time of 1 second or longer has elapsed from reception of the second command after termination of transmitting the audio signal to the other information processing device in step S809. When it is determined in step S901 that the time of 1 second or longer has elapsed (Y in the drawing), the process proceeds to step S810 where the first command is transmitted likewise the process shown in FIG. 8. If the time longer than 1 second has not elapsed (N in the drawing), the process immediately proceeds to step S812 where the third command is transmitted while reducing process steps to accelerate the operation rate.

When it is determined in step S808 that the fifth command has not been received, the flowchart may be structured to forcibly terminate the ARC audio signal output to proceed to step S901. Alternatively, the process for selecting the external device for terminating the ARC audio output in steps S801 to S809 is inserted while executing step S805 as the condition for determining whether the ARC output is executed to two or more devices. This makes it possible to execute the ARC audio output up to the arbitrary number of devices.

The operation performed by the information processing device upon request for supplying the ARC audio signal from the external device will be described referring to FIGS. 11 to 13. The following description shows the example that the display device 40 serves as the information processing device which receives the request to supply the ARC audio signal. The use of the other information processing device may provide the same operation without deviating from the scope of the present invention.

FIG. 11 is a fourth flowchart for audio output processing according to the embodiment of the present invention. FIG. 11 represents the case for determining the supply destination of the ARC audio signal in order of arrival.

In step S1101, the control unit 414 determines whether or not the display device 40 has already executed the ARC audio signal output to any one of the information processing devices.

When it is determined in step S1101 that the display device 40 has already executed the ARC audio signal output to any one of the information processing devices (Y in the drawing), the process proceeds to step S1104 where the rejection command (Feature Abort in the drawing) is transmitted to the information processing device which has required supply of the audio signal likewise step S806 shown in FIG. 8. The process then ends. The flowchart shown in FIG. 11 is structured to determine the supply destination of the ARC audio signal in order of arrival.

When it is determined in step S1101 that the display device 40 has not executed the ARC audio signal output to any one of the information processing devices (N in the drawing), the process proceeds to step S1102 where the CEC control unit 416 transmits the third command (Report ARC Initiated in the drawing) notifying initiation of the ARC audio signal output to the information processing unit which has required supply of the audio signal. Unlike the cases represented in FIGS. 7 and 8, the routine of FIG. 11 does not show the first and the second commands prior to the third command. As described above, FIG. 11 represents the case where the external device has required the information processing unit to supply the ARC audio signal. The routine therein does not contain the first command, and the request as described above corresponds to the second command transmitted to the display device 40.

In step S1103, the output connector selection unit 413 supplies the audio signal from the input switching unit 407 to the HDMI connector connected to the information processing device which has required supply of the audio signal from the HDMI connectors 1 to N (4011 to 401N) for transmitting the ARC audio signal. Then the process ends.

The flowchart shown in FIG. 11 may be structured to execute step S1101 as the condition for determining whether the ARC output is executed to two or more devices to execute the ARC audio output up to arbitrary number of devices.

Another example of the operation flow which is different from the aforementioned one will be described.

Figure 12:
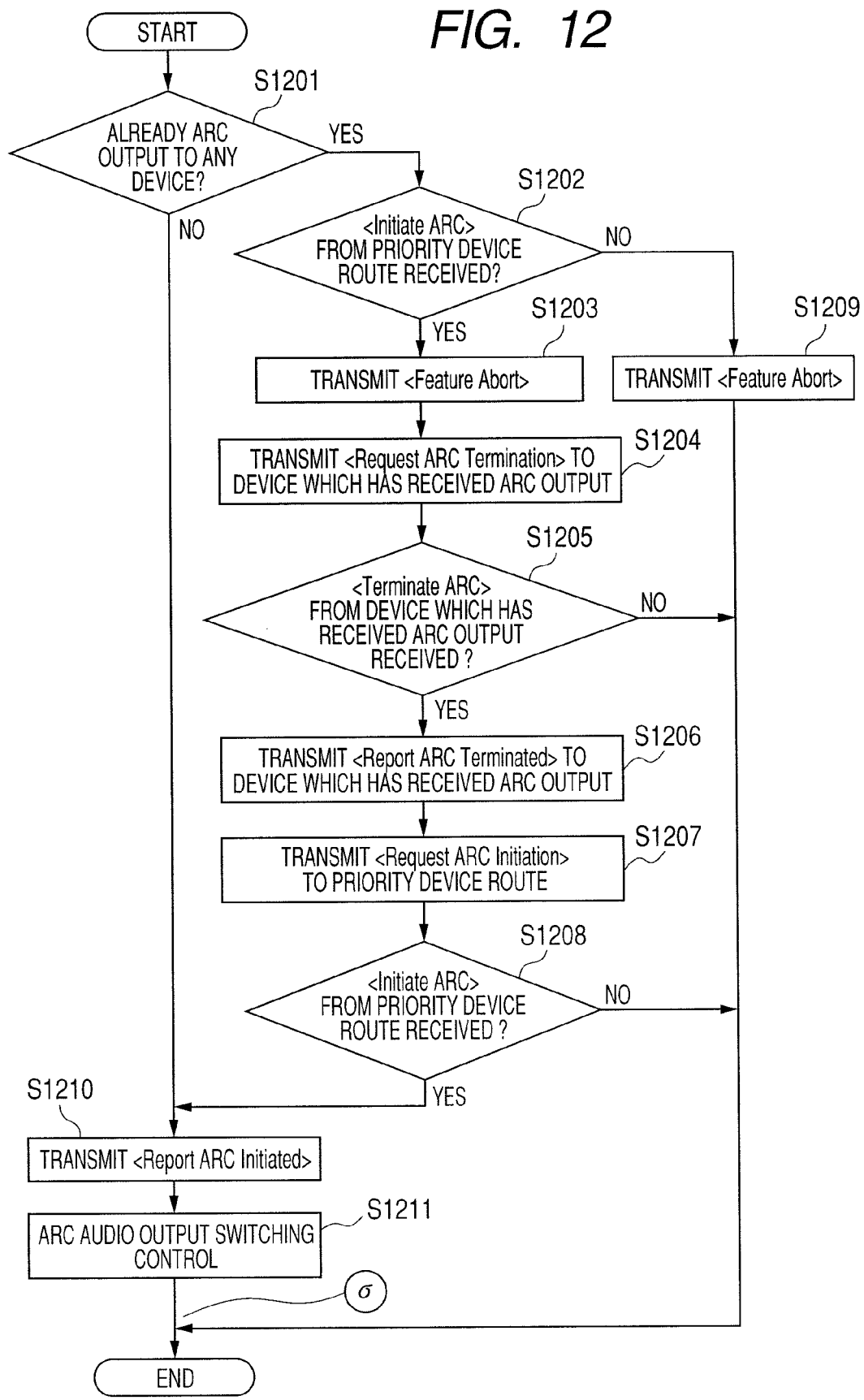
FIG. 12 is a fifth flowchart of the audio output processing according to the embodiment of the present invention.

FIG. 12 is a fifth flowchart of the audio output process according to the embodiment of the present invention. Unlike FIG. 11, FIG. 12 represents the case for prioritizing specific type of device as the output destination of the ARC audio signal, for example, the audio system as the priority device. The manufacturer of the device may preset the specific information processing device to the control unit 414 of the display device 40 as the priority device. Alternatively, the user is allowed to designate the priority device. In the case where the user designates the priority device, the external device regarded as being meaningless to receive the ARC audio signal may be excluded from those to be designated.

In step S1201, the control unit 414 determines whether or not the display device 40 has already executed the ARC audio signal output to any one of the information processing devices.

When it is determined in step S1201 that the display device 40 has not executed the ARC audio signal output to any one of the information processing devices (N in the drawing), the audio signal supply is available. The process then proceeds to step S1210 where the CEC control unit 416 transmits the third command (Report ARC Initiated in the drawing) notifying initiation of the ARC audio signal output to the information processing unit which has required the audio signal supply.

When it is determined in step S1201 that the display device 40 has already executed the ARC audio signal output to any one of the information processing devices (Y in the drawing), the process proceeds to step S1202 where the CEC control unit 416 determines whether the aforementioned second command (Initiate ARC in the drawing) has been received from the route to which the priority device is connected, that is, the HDMI connector to which the priority device is directly connected, and the HDMI connector to which the priority device is connected via the other information processing device.

When it is determined in step S1202 that the second command has not been received from the route to which the priority device is connected (N in the drawing), the following process is executed. When the ARC audio signal output to the other information processing device is executed, the audio signal is not output by switching the information processing device except the priority device. So the process proceeds to step S1209 where the CEC control unit 416 transmits the rejection command (Feature Abort in the drawing) to the information processing device which has required the audio signal supply. The process then ends.

When it is determined in step S1202 that the second command has been received from the route to which the priority device is connected (Y in the drawing), the process proceeds to step S1203 where the CEC control unit 416 transmits the rejection command (Feature Abort in the drawing).

In step S1204, the CEC control unit 416 transmits the fourth command (Request ARC Termination in the drawing) which proposes to terminate the ARC to the information processing device which has been supplying the ARC audio signals.

According to the ARC rule, upon acceptance of the proposal of the display device 40, the information processing device which has received the fourth command is expected to transmit the fifth command (Terminate ARC in step S1205) to the display device 40 to terminate the audio signal transmission. In step S1205, the CEC control unit 416 determines whether or not the display device 40 has received the fifth command from the information processing device.

When it is determined in step S1205 that the fifth command has not been received (N in the drawing), the expected ARC audio output cannot be executed. Then the process ends.

When it is determined in step S1205 that the fifth command has been received (Y in the drawing), the process proceeds to step S1206 where the CEC control unit 416 transmits the sixth command (Report ARC Terminated in the drawing) notifying termination of the ARC audio signal output to the information processing device, and the audio signal output to the information processing unit is terminated.

In step S1207, the CEC control unit 416 transmits the first command (request ARC Initiation) which proposes to initiate the ARC from the route to which the priority device which has required the ARC audio signal supply is connected, that is, the route to which the priority device is connected to the information processing device directly connected to the display device 40.

Then in step S1208, the CEC control unit 416 determines whether or not the second command (Initiate ARC in the drawing) has been received from the route to which the priority device which has required the ARC audio signal supply is connected.

When it is determined in step S1208 that the second command has not been received (N in the drawing), the expected ARC audio output cannot be executed. The process then ends.

When it is determined in step S1208 that the second command has been received (Y in the drawing), the process proceeds to step S1210 where the CEC control unit 416 transmits the third command (Report ARC Initiated in the drawing) notifying the route to which the priority device which has required the audio signal supply is connected of initiation of the ARC audio signal output.

In addition to the case where it is determined instep S1201 that the display device 40 has not executed the ARC audio signal output (N in the drawing) to any one of the information processing devices, and the process proceeds to step S1210, in step S1211, the output connector selection unit 413 transmits the audio signal from the input switching unit 407 to the HDMI connector to which the aforementioned priority device route is connected for the ARC audio signal transmission. Then process then ends.

That is, in the flowchart shown in FIG. 12, when the ARC audio signal output is executed to the other information processing device (Y in step S1201), the output connector selection unit 413 supplies the audio signal by switching the output destination to the priority device route only when the request is sent from the information processing device as the priority device.

Referring to FIG. 12, when it is determined in step S1205 that the fifth command has not been received, the flowchart may be structured to forcibly terminate the ARC audio signal output to proceed to step S1207. Alternatively, the flowchart may be structured to execute step S1201 as the condition for determining whether the ARC output is executed to two or more devices, and to insert the process for selecting the external device for terminating the ARC audio output in steps S1204 to S1206 so as to allow the ARC audio output up to the arbitrary number of devices.

Another operation flow which is slightly different from the one shown in FIG. 12 will be described.

Figure 13:
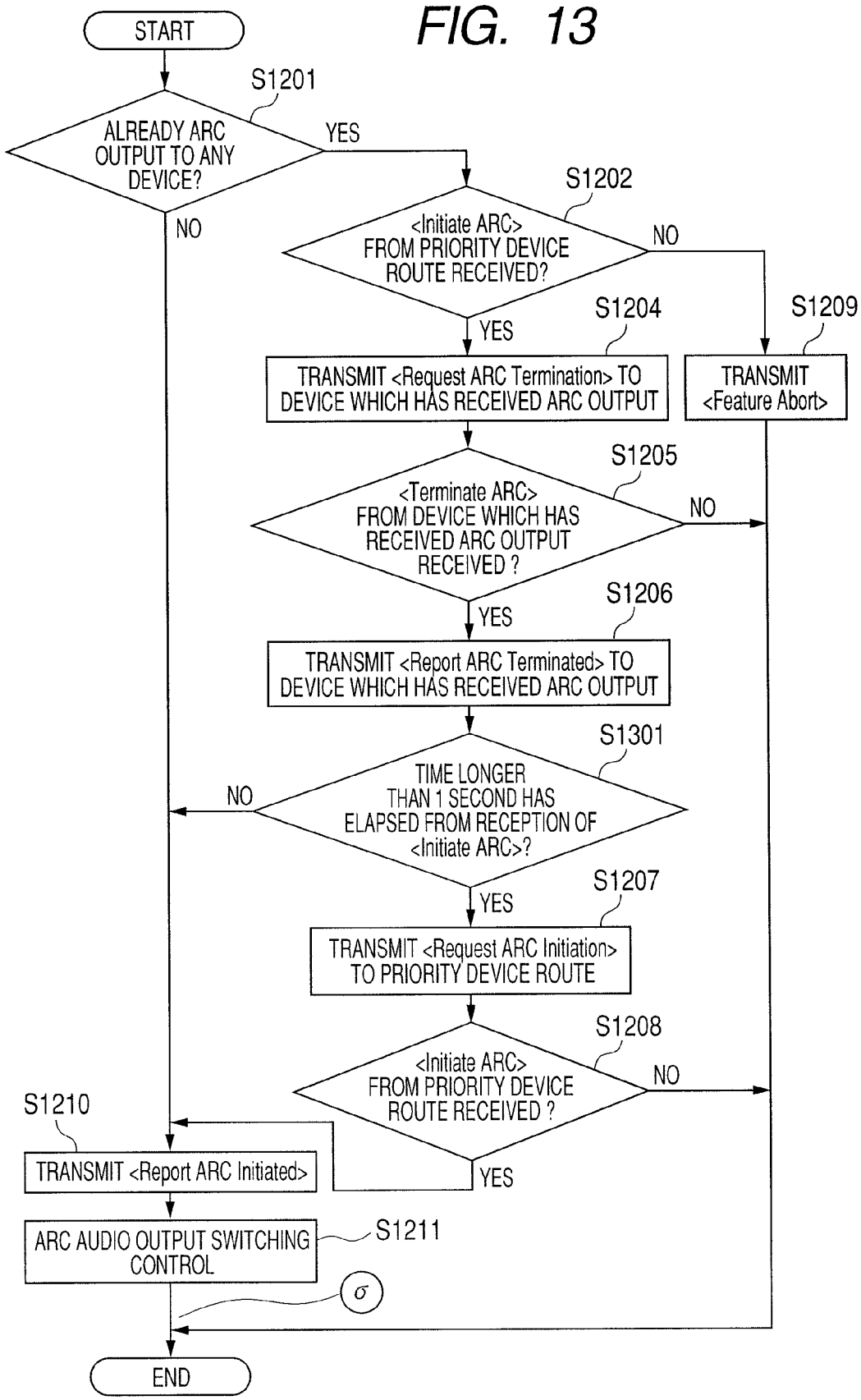
FIG. 13 is a sixth flowchart of the audio output processing according to the embodiment of the present invention.

FIG. 13 is a sixth flowchart for audio output processing according to the embodiment of the present invention. Likewise FIG. 12, FIG. 13 represents the case where the audio system is designated as the priority device which is the output destination of the ARC audio signal. The flowchart shown in FIG. 13 is substantially the same as the one shown in FIG. 12 except that step S1301 is added while omitting step S1203 shown in FIG. 12. The aforementioned difference is similar to the one between FIGS. 8 and 9.

Unlike FIG. 12, the flowchart of FIG. 13 contains step S1301 where the CEC control unit 416 determines whether or not the time longer than 1 second has elapsed from reception of the second command subsequent to termination of the audio signal transmission to the other information processing device in step S1206. When it is determined in step S1301 that the time longer than 1 second has elapsed (Y in the drawing), the process proceeds to step S1207 to transmit the first command likewise the process shown in FIG. 12. When it is determined that the time longer than 1 second has not been elapsed (N in the drawing), the process immediately proceeds to step S1210 where the third command is transmitted to accelerate the operation rate by reducing processing steps.

When it is determined in step S1205 that the fifth command has not been received in FIG. 13, the ARC audio signal output may be forcibly terminated to further proceed to step S1301. Alternatively, the flowchart may be structured to execute step S1201 as the condition for determining whether the ARC output is executed to two or more devices, and insert the process for selecting the external device for terminating the ARC audio output in steps S1204 to S1206 so as to allow the ARC audio output up to the arbitrary number of devices.

Those embodiments which have been described are mere examples without limiting the present invention. For example, the block diagram of the display device 40 shown in FIG. 4 is only an example, which may be modified into various forms. The block diagram of the information processing device other than the aforementioned display device may be different. Besides, various embodiments may be considered based on the present invention, which are contained in the scope of the present invention.

While we have shown and described several embodiments in accordance with our invention, it should e understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An information processing device for processing an input information signal which contains an audio signal, comprising:
   Plural High Definition Multimedia Interface (HDMI) connectors for transmission and reception of the information signal with an external information processing device;
   an audio separation unit for separating the audio signal from the information signal supplied from the HDMI connectors;
   an output connector selection unit which selects at least one of the plural HDMI connectors so as to supply the audio signal separated by the audio separation unit to the selected HDMI connector, or does not supply the audio signal to any one of the HDMI connectors; and
   a control unit for controlling an entire operation of the information processing device, wherein the control unit controls the output connector selection unit to output the separated audio signal to the external information processing device from one of the plural HDMI connectors based on a predetermined condition;
   wherein:
   the predetermined condition is an issue order of a command of the information processing device to the external information processing device to output the audio signal to a specified external information processing device of external information processing devices, or a command of the specified external information processing device to the information processing device to output the audio signal to the specified external information processing device; and
   the control unit controls the output connector control unit to output the separated audio signal to the specified external information processing device from the HDMI connector, to which the specified external information processing device has been connected based on the command in the command issue order.

2. The information processing device according to claim 1, further comprising an On Screen Display (OSD) circuit for superimposing an OSD display which notifies a user of output of the separated audio signal to the external information processing device on the separated video signal.

3. An information processing device for processing an input information signal which contains a video signal and an audio signal, comprising:

Plural High Definition Multimedia Interface (HDMI) connectors for transmission and reception of the information signal with an external information processing device;

a first video audio separation unit for separating a first video signal and a first audio signal accompanied with the first video signal, from the information signal supplied from the HDMI connectors;

a broadcast receiver unit for receiving a broadcast signal of a television broadcast;

a second video audio separation unit for separating a second video signal and a second audio signal accompanied with the second video signal, from the broadcast signal received by the broadcast receiver unit;

an input switching unit for selecting one of the supplied first video signal separated by the first video audio separation unit and the supplied second video signal separated by the second video audio separation unit, and selecting one of the first audio signal separated by the first video audio separation unit and the second audio signal separated by the second video audio separation unit in synchronization with the video signal;

a display unit for receiving the video signal selected by the input switching unit to display the video information contained in the video signal;

a speaker for receiving the audio signal selected by the input switching unit to generate audio information contained in the audio signal;

an output connector selection unit which receives the audio signal selected by the input switching unit to supply the audio signal to at least one of the plural HDMI connectors by selection or does not supply the audio signal to any one of the HDMI connectors;

a control unit for controlling an entire operation of the information processing device, wherein the control unit controls the output connector selection unit to output the separated audio signal from one of the plural HDMI connectors to the external information processing device based on a predetermined condition; and wherein:

the predetermined condition is an issue order of a command of the information processing device to the external information processing device to output the audio signal to a specified external information processing device of external information processing devices, or a command of the specified external information processing device to the information processing device to output the audio signal to the specified external information processing device; and the control unit controls the output connector control unit to output the separated audio signal to the specified external information processing device from the HDMI connector, to which the specified external information processing device has been connected based on the command in the command issue order.

4. The information processing device according to claim 3, further comprising an On Screen Display (OSD) circuit for performing an OSD display which notifies a user of output of the separated audio signal to the external information processing device on the display unit.

* * * * *